3,355,449
WATER SOLUBLE CELLULOSE ETHERS AND
THEIR PRODUCTION
Kagenobu Inoshita and Tadamasa Morikawa, Shiga-gun,
Japan, assignors to Toyo Spinning Co., Ltd., Osaka,
Japan
No Drawing. Filed June 10, 1964, Ser. No. 374,183
Claims priority, application Japan, June 19, 1963,
38/32,223
6 Claims. (Cl. 260—231)

The present invention relates to a process for producing water-soluble cellulose ether and, more particularly, to a process for producing said cellulose ether which comprises a pre-treatment for alkylating, cyanoethylating or carboxymethylating cellulose and an after-treatment for hydroxyalkylating the resulting product.

Generally, there are two known processes, namely the slurry process and the vacuum process, for producing hydroxyalkyl cellulose by reacting alkali cellulose with alkylene oxide such as ethylene oxide, propylene oxide, etc. The former process is characterized in that in reacting starting material cellulose with an etherifying agent, alkali metal hydroxide is used as cellulose swelling agent and reaction catalyst in the presence of water as solvating agent and a hydrophilic or hydrophobic organic solvent as diluent. In the latter process, no diluent is employed and alkali cellulose is placed in a closed vessel, in which an etherifying agent is applied in mist form by spraying or other technique in vacuum. In the former process, however, since the reaction is conducted in solution, the reaction rate is low and it is difficult to separate the diluent for recovery, with distillation and other procedures being required for the diluent to be recycled. In addition, the product being water-soluble, the purification of the salt obtained is rendered considerably difficult. Further, in the latter process, the reaction is conducted in the gaseous phase so that the reaction does not proceed uniformly and it is also extremely difficult to remove the impurities from the reaction product.

In view of the foregoing, we have explored into possible methods of producing water-soluble cellulose ether and have succeeded in reducing the reaction time, making the reaction more uniform, and rationalizing the purification and drying procedures. Thus, this invention is concerned with a method of producing water-soluble cellulose ether characterized by pre-treating cellulose with a number selected from the class consisting of alkyl halides, acrylonitrile, and halogenated acetic acid as well as its salts in the presence of alkali and water, removing at least a major part of the alkali present in the system, and, finally, contacting the product with gaseous alkylene oxide. While the pre-treatment of the invention may be conducted in the liquid phase, it is more convenient to the starting material cellulose, e.g. viscose pulp, is preliminarily treated with a 15–25% or, preferably, a 17–20% aqueous solution of caustic alkali, the excess of said aqueous solution of caustic alkali is removed by pressing the product to a press ratio of from 1.5 to 4.0 or, preferably, 2.0–3.0 times, and, lastly, the resulting alkali cellulose is transferred to a closed vessel for said pre-treatment. At this point, the alkali cellulose may contain from 20% to 200% or, preferably, from 30% to 100% of alkali based on the weight of cellulose. Thus, the closed vessel containing said alkali cellulose is decompressed and the reaction is conducted in the gaseous phase by introducing a member of alkyl halide, acrylonitrile and halogenated acetic acid as well as their salts in such a manner that the degree of substitution per unit of anhydrous glucose (hereinafter referred to as D.S.) of the cellulose reaches 0.05–0.5 or, preferably 0.10–0.40. The product is substantially insoluble in water.

Then, if required, the excess of the pre-treating agent is removed and a greater part of the existing alkali is removed from the pre-treated product. For example, the excess alkali may be easily removed by diluting the reaction product with water and, then, pressing the mixture. Thus, the reaction product is first diluted with about 15–60 times of water based on the weight of the pre-treated cellulose and the mixture is then pressed to a press ratio of from about 2 to about 3, whereupon the alkali content of the pre-treated product is reduced to less than about 10 percent based on the weight of the pre-treated cellulose. By this treatment, the salt and other impurities formed in the course of said reaction are also removed from the product.

In accordance with the invention, the resulting pre-treated cellulose containing less than about 10 percent of alkali based on the weight of said pre-treated cellulose is reacted with gaseous alkylene oxide. For example, the pre-treated cellulose and alkylene oxide are introduced into different closed vessels, and the vessel containing the cellulose is decompressed before the two vessels are interconnected. In this manner, the completely gasified alkylene oxide is gradually brought into contact with the cellulose to initiate the etherification reaction. Since this reaction is an exothermic one, it is preferably controlled within the range of, for example, 15° C. to 35° C. so that the etherification reaction may proceed uniformly. Especially, when the reaction is conducted at lower temperature during the initial period of time and, then, after the temperature is slightly increased, the reaction is further allowed to proceed, so that the excessive etherification at the early stage can be successfully avoided. In addition, by stirring the reaction system, the reaction may be allowed to proceed still more uniformly. The etherification is continued until the number of mols of alkylene oxide (hereinafter referred to as M.S.) added to the cellulose reaches more than 1.0 and, preferably, more than 1.4 per unit of anhydrous glucose. Thus, in the present invention, since the molecular orientation of cellulose is rendered suitably less compact by the pre-treatment, the etherification reaction is allowed to proceed successfully even when the amount of alkali present is relatively small. Furthermore, since an entirely gaseous etherifying agent is employed, the process of the invention does not result in an uneven reaction which is usually the case with the conventional spray process. The last but not the least important, the reaction time may be further reduced as compared with the conventional slurry process.

The above-mentioned reaction may be suspended as soon as the M.S. of cellulose ether has reached a desired value, for example, by removing the residual alkylene oxide and neutralizing the alkali. It is particularly preferable to effect the neutralization in the gaseous phase by means of carbon dioxide, sulfur dioxide, or methyl acetate, for instance, and in such cases, the reaction product may then be immediately dried and pulverized into a final product, without passing the washing and purification procedures.

In carrying the present invention into practice, as completely gaseous alkylene oxide is gradually reacted with cellulose, the etherification of cellulose not only proceeds more uniformly, but also as compared with the conventional slurry process, the reaction rate can be increased by 400 to 800 percent. Furthermore, since the above reaction is conducted in the presence of a small amount of alkali, the final product contains only small amounts of salts and alkali metal, with the result that it is not always necessary to remove impurities in order to obtain a highly purified cellulose ether. It is also to be understood that since no diluent is employed, such processes as the recovery and distillation of the organic solvent may be needless, and when these facts are taken into consideration, it will be apparent that the process of the present invention is more advantageous economically than the conventional slurry process.

The present invention will be further described in detail by reference to the following examples, in which the term "ash," in all contexts, is expressed in terms of the converted weight of sodium carbonate.

*Example 1*

Cellulose pulp was immersed in an 18.5% aqueous solution of caustic soda at 20° C. for 1.5 hours, and the resulting mixture was pressed to 270% of the weight of the pulp to remove the excess alkali solution. Then, the pulp was shredded by means of a Werner shredder for 1.5 hours to obtain alkali cellulose flakes (alpha cellulose 33.0%, caustic soda 15.5%) at the room temperature. 1800 parts of this alkali cellulose was placed in a closed vessel, from which the air was completely replaced with nitrogen gas. Then, under vacuum, 85 parts of methyl chloride was fed to the vessel to initiate a methylation reaction at a constant temperature of 70° C. for 1.5 hours, at the end of which time 18,000 parts of water were added and the mixture was stirred until the resulting methyl cellulose was dispersed in the water. The methyl cellulose slurry obtained as above was centrifugally dehydrated, followed by pressing the residue to 260% based on the weight of methyl cellulose to remove the salt that had been formed in the course of methylation and the excess aqueous alkali solution. The methyl cellulose was then shredded by means of a Werner shredder to obtain substantially insoluble methyl cellulose flakes containing 1.84% of caustic soda, 59.3% of water, and 38.9% of cellulose and having a D.S. value of 0.21. 700 parts of these methyl cellulose flakes were placed in a closed vacuum vessel, which was then connected with another closed vessel containing 280 parts of liquid ethylene oxide so that the two contents were communicable with each other through a cock in a thermostatic vessel. In this manner, only the completely gassified ethylene oxide was brought into contact with methyl cellulose to initiate an etherification reaction. This etherification reaction was conducted at 25° C. for 2 hours while stirring the methyl cellulose and, then, at 35° C. for another 3 hours. At the end of this time, the residual ethylene oxide was removed and sulfur dioxide gas was introduced into the vessel. The alkali present in the system was thus neutralized at 35° C. with stirring for half an hour. The resulting cellulose ether was dried at 60° C. and under reduced pressure for 6 hours, at the end of which time it was pulverized to prepare Product 1. This cellulose ether was completely soluble in water and a 2% aqueous solution of this product had a viscosity of 605 cps. at 20° C.

On the other hand, controls were prepared in the following manner. Thus, the same methyl cellulose as above was etherified under the same conditions as above in 10 parts (based on 1 part of methyl cellulose) of methanol-acetone and, after a neutralization with acetic acid, the product was dried and pulverized to obtain Product 2. Product 3 was prepared by conducting an etherification reaction in the perfect gaseous phase under the same conditions as above, except that the cellulose was not preliminarily methylated. The results of a comparison of these three products are summarized in the following table.

| | Process | M.S. | Solubility | Ash (percent) |
|---|---|---|---|---|
| 1 | Methylation, plus perfect gaseous phase etherification. | 1.63 | 100 | 2.3 |
| 2 | Methylation, plus liquid phase etherification. | 0.98 | 68 | 2.4 |
| 3 | Perfect gaseous phase etherification, without methylation. | 0.14 | 5.2 | 2.3 |

Referring to Process 2, in order to obtain a product which is completely soluble in water, it is necessary to add 300 parts of ethylene oxide and conduct the etherification reaction at 40° C. for 20 hours.

*Example 2*

In the same manner as Example 1, 1800 parts of alkali cellulose flakes were prepared. These flakes were placed in a closed vessel, which was then made vacuum. Then, 520 parts of 49% monochloracetic acid was added in mist form and the mixture was rotation-agitated at 60° C. to carboxymethylate the cellulose. The resulting carboxymethyl cellulose was divided into two portions, and one of them was diluted with 13,500 parts of water and the mixture pressed to 247% based on the weight of the carboxymethyl cellulose. This carboxymethyl cellulose was shredded with a Werner shredder to prepare carboxymethylcellulose flakes (1), which contained 1.54% of caustic soda, 57.9% of water and 40.53% of cellulose and had a D.S. value of 0.12. The other portion of said carboxymethyl cellulose was diluted with 18,000 parts of water and the mixture was pressed to 245%. This carboxymethyl cellulose was shredded in the same manner as above to obtain carboxymethyl cellulose flakes (2) which contained 1.36% of caustic soda, 57.8% of water and 40.9% of cellulose and had a D.S. value of 0.12. These two types of flakes were placed in separate closed vessels and were respectively etherified by adding 310 parts of ethylene oxide and rotation-agitating the mixture at 20° C. for 2 hours and at 30° C. for an additional 4 hours. After the reaction, the vessels were made vacuum, and 40 parts each of methyl acetate were added to neutralize the products at 60° C. for 0.5 hour. The neutralized products were dried in vacuum and pulverized, whereupon water-soluble cellulose ethers having the following compositions were obtained.

| | Press ratio, (percent) | M.S. | Solubility (percent) | Ash (percent) |
|---|---|---|---|---|
| (1) | 247 | 1.6 | 100 | 2.0 |
| (2) | 245 | 1.48 | 96.5 | 1.7 |

*Example 3*

In the same manner as Example 1, 900 parts of alkali cellulose flakes were prepared. These flakes were placed in a closed vessel, followed by the addition of 120 parts of acrylonitrile in mist form in the same manner as Example 1 to cyanoethylate the cellulose at 20° C. After the reaction, the product was diluted with 9000 parts of water and the mixture was pressed to 256% based on the weight of the cyanoethyl cellulose, followed by pulverization to obtain cyanoethyl cellulose flakes. These flakes contained 2.25% of caustic soda, 58.7% of water and 39.2% of cellulose and had a D.S. value of 0.18. The flakes were then placed in a closed vessel and, in the same manner as Example 1, were etherized by adding 350 parts of propylene oxide and rotation-agitating the mixture at 35° C. for 2 hours and at 40° C. for an additional 2 hours. After the reaction, carbon dioxide gas was introduced into the vessel to neutralize the product at 35° C. for 0.5 hour. The neutralized product was dried in vacuum and pulverized, whereupon completely a water-soluble product having a M.S. value of 1.72 and an ash content of 2.9% was obtained. A 2% aqueous solution of this product had a viscosity of 520 cps.

*Example 4*

In the same manner as Example 1, 1800 parts of alkali cellulose flakes were prepared. These flakes were placed in a closed vessel, which was then made vacuum. 420 parts of 75% sodium monochloracetate was then added in mist form to carboxymethylate the cellulose at 55° C. with rotation-agitation. The resulting carboxymethyl cellulose was diluted with 18,000 parts of water and the mixture was pressed to 230% based on the weight of the carboxymethyl cellulose. The carboxymethyl cellulose prepared as above was then shredded with a Werner shredder to obtain carboxymethyl cellulose flakes which were substantially insoluble in water and contained 1.5% of caustic soda, 55.4% of water, and 43.1% of cellulose, with a D.S. value of 0.11. The flakes were then placed in a closed vessel and, in the same manner as Example 1, were etherized by adding 600 parts of ethylene oxide and rotation-agitating the mixture at 25° C. for 1 hour and at 30° C. for an additional 4 hours. After the reaction, the vessel was made vacuum and the product was neutralized with carbon dioxide gas. The neutralized product was dried in vacuum and pulverized to obtain a completely water-soluble cellulose ether having a M.S. value of 1.7 and an ash content of 2.0%. A 2% aqueous solution of this product had a viscosity of 1100 cps. at 20° C.

*Example 5*

In the same manner as Example 1, 900 parts of alkali cellulose flakes were prepared. These flakes were placed in a closed vessel, which was then made vacuum. The flakes were ethylated by adding 60 parts of ethyl chloride and rotation-agitating the mixture at 80° C. for 2 hours. The resulting ethyl cellulose was diluted with 6800 parts of water and the mixture was pressed to 260% based on the weight of the ethyl cellulose. This ethyl cellulose was shredded with a Werner shredder to obtain ethyl cellulose flakes which was substantially insoluble in water and contained 2.3% of caustic soda, 59.2% of water and 38.5% of cellulose, with a D.S. value of 0.18. 700 parts of this ethyl cellulose was placed in a closed vessel and, in the same manner as Example 1, was etherized by adding 300 parts of ethylene oxide and rotation-agitating the mixture at 30° C. for 5.5 hours. After the reaction, the vessel was made vacuum and the product neutralized with acetic anhydride. The neutralized product was dried in vacuum and, then, pulverized. This product was completely water-soluble and had a M.S. value of 2.1 and an ash content of 2.8%.

*Example 6*

In the same manner as Example 1, 900 parts of alkali cellulose flakes were prepared. These flakes were placed in a closed vessel, which was then made vacuum. The flakes were methylated by adding 40 parts of methyl chloride and rotation-agitating the mixture at 70° C. for 2.5 hours. The resulting methyl cellulose was diluted with 9000 parts of water and the mixture was pressed to 250% based on the weight of the methyl cellulose. This methyl cellulose was then shredded with a Werner shredder to obtain methyl cellulose flakes which had a D.S. value of 0.23, was substantially insoluble in water, and contained 2.1% of caustic soda, 58% of water and 39.9% of cellulose. 600 parts of this methyl cellulose was placed in a closed vessel and, in the same manner as Example 1, was etherized by adding 310 parts of propylene oxide and rotation-agitating the mixture at 40° C. for 3.5 hours. After the reaction, the vessel was made vacuum and the mixture neutralized with sulfur dioxide gas. The neutralized product was dried in vacuum and, then, pulverized. The product of this example had a M.S. value of 1.6 and an ash content of 2.4% and was completely water-soluble. A 2% aqueous solution of this product had a viscosity of 500 cps. at 20° C.

*Example 7*

In the same manner as Example 1, 900 parts of alkali cellulose flakes were prepared. These flakes were fed to a closed vessel along with 120 parts of acrylonitrile and 4500 parts of benzene. The resulting slurry was rotation-agitated at 20° C. for 3.0 hours to cyanoethylate the cellulose. After the excess benzene was centrifugally removed, the cyanoethyl cellulose was diluted with 4500 parts of water and the mixture was pressed to 246% based on the weight of the cyanoethyl cellulose. This product was shredded with a Werner shredder to obtain cyanoethyl cellulose flakes which had a D.S. value of 0.16 and contained 40.5% of water, 2.2% of caustic soda and 40.5% of cellulose. 700 parts of this cyanoethyl cellulose was placed in a closed vessel and, in the same manner as Example 1, was etherized by adding 300 parts of ethylene oxide and rotation-agitating the mixture at 30° C. for 5.0 hours. After the reaction, the vessel was made vaccum and the reaction product neutralized with sulfur dioxide gas. The neutralized product was dried in vacuum and, then, pulverized. The product of this example had a M.S. value of 1.8 and an ash content of 2.5%. It was found to be completely water-soluble.

What we claim is:

1. A process for producing water-soluble cellulose ether which comprises (1) pre-treating cellulose with a 15 to 25% aqueous solution of caustic alkali, (2) pressing the resulting alkali cellulose to a press ratio of from 1.5 to 4.0, (3) treating the pressed cellulose with a member selected from the class consisting of alkylhalide, acrylonitrile, and halogenated acetic acid and salts thereof until a D.S. value of from 0.05 to 0.5 is attained, (4) reducing the amount of the alkali to less than 10% based on the weight of the pre-treated cellulose, and (5) contacting the treated cellulose with gaseous alkylene oxide.

2. A process as claimed in claim 1, wherein the treatment of cellulose with a member selected from the class consisting of alkyl halide, acrylonitrile and halogenated acetic acid and salts thereof in the presence of alkali and water is conducted in the liquid phase.

3. A process as claimed in claim 1, wherein the treatment of cellulose with a member selected from the class consisting of alkyl halide, acrylonitrile and halogenated acetic acid and salts thereof in the presence of alkali and water is conducted in the gaseous phase.

4. A process as claimed in claim 1, wherein the pretreated cellulose is reacted with alkylene oxide until a M.S. value of more than 1.0 is attained.

5. A process as claimed in claim 1, wherein after cellulose is etherified with alkylene oxide, the residual alkylene oxide is removed and the alkali present in the system is neutralized in the gaseous phase with an alkaline neutralizing agent from the group of carbon dioxide, sulfur dioxide and methyl acetate.

6. A process for producing water-soluble cellulose ether which comprises (1) pre-treating cellulose with a 15 to 25% aqueous solution of caustic alkali, (2) pressing the resulting alkali cellulose to a press ratio of from 1.5 to 4.0, (3) treating the pressed cellulose in the gaseous phase or the liquid phase with a member selected from the class consisting of alkyl halide, acrylonitrile, and halogenated acetic acid and salts thereof until a D.S. value of from 0.05 to 0.5 is attained, (4) reducing the amount of the alkali to less than about 10% based on the weight of the pre-treated (5) cellulose, contacting the cellulose further with gaseous alkylene oxide to attain a M.S. value of more than 1.0, (6) removing the excess alkylene oxide and (7) neutralizing the alkali in the gaseous phase.

References Cited

UNITED STATES PATENTS 2,618,632  11/1952  Klug _____ 260—231
2,644,818  7/1953  Downing et al. _____ 260—231

DONALD E. CZAJA, *Primary Examiner.*

R. W. MULCAHY, *Assistant Examiner.*